(12) United States Patent
Mulligan

(10) Patent No.: US 7,747,066 B2
(45) Date of Patent: Jun. 29, 2010

(54) Z-AXIS OPTICAL DETECTION OF MECHANICAL FEATURE HEIGHT

(75) Inventor: Vincent P. Mulligan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 11/376,022

(22) Filed: Mar. 15, 2006

(65) Prior Publication Data

US 2007/0217675 A1    Sep. 20, 2007

(51) Int. Cl.
G06K 9/00 (2006.01)
G06K 9/36 (2006.01)
G06K 9/48 (2006.01)

(52) U.S. Cl. ............... 382/152; 382/151; 382/199; 382/168; 382/286

(58) Field of Classification Search ......... 382/141–152, 382/168–172
See application file for complete search history.

(56) References Cited

U.S. PATENT DOCUMENTS

| | | | | |
|---|---|---|---|---|
| 4,650,333 A * | 3/1987 | Crabb et al. | ............... | 356/606 |
| 5,748,773 A * | 5/1998 | Tashiro et al. | ............... | 382/169 |
| 6,002,793 A * | 12/1999 | Silver et al. | ............... | 382/152 |
| 6,028,673 A * | 2/2000 | Nagasaki et al. | ............... | 356/608 |
| 6,104,493 A * | 8/2000 | Fuse et al. | ............... | 356/627 |
| 6,201,892 B1 * | 3/2001 | Ludlow et al. | ............... | 382/149 |
| 6,549,644 B1 * | 4/2003 | Yamamoto | ............... | 382/118 |
| 6,603,103 B1 * | 8/2003 | Ulrich et al. | ............... | 250/205 |
| 6,621,926 B1 * | 9/2003 | Yoon et al. | ............... | 382/168 |
| 6,717,518 B1 * | 4/2004 | Pirim et al. | ............... | 340/576 |
| 6,850,646 B1 * | 2/2005 | Silver et al. | ............... | 382/199 |
| 6,879,403 B2 * | 4/2005 | Freifeld | ............... | 356/601 |
| 6,975,764 B1 * | 12/2005 | Silver et al. | ............... | 382/209 |
| 7,394,926 B2 * | 7/2008 | Bryll et al. | ............... | 382/141 |
| 7,508,529 B2 * | 3/2009 | Gladnick et al. | ............... | 356/603 |
| 7,526,118 B2 * | 4/2009 | Davis et al. | ............... | 382/141 |
| 2003/0152266 A1 * | 8/2003 | Ivers et al. | ............... | 382/169 |
| 2003/0169907 A1 * | 9/2003 | Edwards et al. | ............... | 382/118 |
| 2005/0100215 A1 * | 5/2005 | Nygaard, Jr. | ............... | 382/181 |
| 2006/0210121 A1 * | 9/2006 | Nakano et al. | ............... | 382/117 |
| 2007/0081721 A1 * | 4/2007 | Xiao et al. | ............... | 382/167 |

* cited by examiner

*Primary Examiner*—Bhavesh M Mehta
*Assistant Examiner*—Mia M Thomas
(74) *Attorney, Agent, or Firm*—Steven Lieske Bennett

(57) ABSTRACT

Height attributes of features of an object having a plurality of physical features thereon is determined by illuminating the features of the object at a low angle and capturing the reflected light at a camera mounted along the z-axis perpendicular to the object. The reflected light from the features is analyzed to determine if any of the features is of an unacceptable height. The reflected light being either brighter or dimmer than the average determines that the corresponding feature is higher or lower respectively than the average feature.

20 Claims, 14 Drawing Sheets

Z-AXIS OPTICAL DETECTION OF MECHANICAL FEATURE HEIGHT

FIELD OF THE INVENTION

The present invention is related to optical measurement of mechanical features of an object.

BACKGROUND OF THE INVENTION

In development and manufacturing of mechanical objects, inspection of components may be automated by the use of computer systems analyzing digital images of components captured by digital cameras (using Machine Vision software). Machine Vision is the art of processing images using a computer. Until now, analyzing z-axis feature height using digital images taken by a camera from a position on the z-axis has been problematic. An example of an inspection problem would be two similar features that only differ in their height and when looking from above at the parts they appear to be identical. To detect the difference in their z-axis heights when the image is taken along the z-axis, a 2D image doesn't currently enable the machine vision tool to determine the Z value (height) of features. All features appear to be on the same flat surface of the 2D image.

U.S. Pat. No. 6,975,764: "Fast high-accuracy multi-dimensional pattern inspection" Filed Sep. 8, 2003, incorporated herein by reference teaches a method and apparatus are provided for identifying differences between a stored pattern and a matching image subset, where variations in pattern position, orientation, and size do not give rise to false differences. The invention is also a system for analyzing an object image with respect to a model pattern so as to detect flaws in the object image. The system includes extracting pattern features from the model pattern; generating a vector-valued function using the pattern features to provide a pattern field; extracting image features from the object image; evaluating each image feature, using the pattern field and an n-dimensional transformation that associates image features with pattern features, so as to determine at least one associated feature characteristic; and using at least one feature characteristic to identify at least one flaw in the object image. The invention can find at least two distinct kinds of flaws: missing features, and extra features. The invention provides pattern inspection that is faster and more accurate than any known prior art method by using a stored pattern that represents an ideal example of the object to be found and inspected, and that can be translated, rotated, and scaled to arbitrary precision much faster than digital image re-sampling, and without pixel grid quantization errors. Furthermore, since the invention does not use digital image re-sampling, there are no pixel quantization errors to cause false differences between the pattern and image that can limit inspection performance.

U.S. Pat. No. 6,850,646 "Fast high-accuracy multi-dimensional pattern inspection" Filed Nov. 10, 2003 and incorporated herein by reference teaches a method and apparatus are provided for identifying differences between a stored pattern and a matching image subset, where variations in pattern position, orientation, and size do not give rise to false differences. The invention is also a system for analyzing an object image with respect to a model pattern so as to detect flaws in the object image. The system includes extracting pattern features from the model pattern; generating a vector-valued function using the pattern features to provide a pattern field; extracting image features from the object image; evaluating each image feature, using the pattern field and an n-dimensional transformation that associates image features with pattern features, so as to determine at least one associated feature characteristic; and using at least one feature characteristic to identify at least one flaw in the object image. The invention can find at least two distinct kinds of flaws: missing features, and extra features. The invention provides pattern inspection that is faster and more accurate than any known prior art method by using a stored pattern that represents an ideal example of the object to be found and inspected, and that can be translated, rotated, and scaled to arbitrary precision much faster than digital image re-sampling, and without pixel grid quantization errors. Furthermore, since the invention does not use digital image re-sampling, there are no pixel quantization errors to cause false differences between the pattern and image that can limit inspection performance.

U.S. Pat. No. 4,650,333 "System for measuring and detecting printed circuit wiring defects" Filed Apr. 12, 1984 incorporated herein by references teaches a non-contact system for detecting printed circuit wiring defects and for measuring circuit feature height relative to a substrate. The system has an energy source for illuminating the substrate and circuit features and a scanner for both instantaneously receiving energy reflected from the substrate and circuit features and for generating a signal in response to the reflected energy, which signal is adapted to vary with the intensity of the reflected energy. An analyzer is connected to the scanner for correlating the generated signal to a measurement representative of the height of the circuit features relative to the substrate. Variations and non-uniformity of the substrate surface due to bending, warpage or other causes can be accounted for so as to provide an accurate measurement of the height of a circuit feature relative to the substrate surface on which it is mounted.

U.S. Pat. No. 6,603,103 "Circuit for machine-vision system" Filed Aug. 7, 1999 incorporated herein by reference teaches manufacturing lines include inspection systems for monitoring the quality of parts produced. Manufacturing lines for making semiconductor devices generally inspect each fabricated part. The information obtained is used to fix manufacturing problems in the semiconductor fab plant. A machine-vision system for inspecting devices includes a light source for propagating light to the device and an image detector that receives light from the device. Also included is a light sensor assembly for receiving a portion of the light from the light source. The light sensor assembly produces an output signal responsive to the intensity of the light received at the light sensor assembly. A controller controls the amount of light received by the image detector to a desired intensity range in response to the output from the light sensor. The image detector may include an array of imaging pixels. The imaging system may also include a memory device which stores correction values for at least one of the pixels in the array of imaging pixels. To minimize or control thermal drift of signals output from an array of imaging pixels, the machine-vision system may also include a cooling element attached to the imaging device. The light source for propagating light to the device may be strobed. The image detector that receives light from the device remains in a fixed position with respect to the strobed light source. A translation element moves the strobed light source and image detector with respect to the device. The strobed light may be alternated between a first and second level.

U.S. Pat. No. 6,052,189 "Height measurement device and height measurement method" Filed Aug. 11, 1997 incorporated herein by reference teaches a height measurement device that can accurately measure the height of an object to be measured, and that can easily and precisely adjust the focal point of an optical system. According to the present invention, a height measurement device, which forms an image of a light point generated by a light source on a surface of a measured object via an irradiation side focusing lens, which forms an image of the formed image of the light point on a light point position detector via a light reception side focusing lens, and measures a height of the measured object according to the light point position on the light point position detector, comprises: a stage perpendicularly movable with the measured object mounted thereon; a camera for obtaining a light point image formed on a target face on the stage; and a controller for detecting a position of the stage or of the radiation focusing lens as a focal point, at which a light quantity on a predetermined pixel in the light point image obtained by the camera becomes a maximum level, while moving the stage or the irradiation side focusing lens.

None of these methods solves the problem of detecting feature height defects using a captured image of an object.

SUMMARY OF THE INVENTION

Height attributes of features of an object having a plurality of physical features thereon is determined by illuminating the features of the object at a low angle and capturing the reflected light at a camera mounted along the z-axis perpendicular to the object. The reflected light from the features is analyzed to determine if any of the features is of an unacceptable height. The reflected light being either brighter or dimmer than the average determines that the corresponding feature is higher or lower respectively than the average feature.

It is therefore an object of the invention to detect height attributes of an object, by creating from an image of the object, a feature histogram of each of a plurality of selected features of the object; calculating a mean value for each of the feature histograms created; calculating an average value of the plurality of calculated mean values; determining from the average value, a range of acceptable values according to predetermined criteria; and analyzing each calculated mean value to determine if it is within the range of acceptable values.

It is another object of the invention to capture the image of the object with a digital camera; and transfer the image of the object from the digital camera to an analyzing computer system.

It is yet another object of the invention to illuminate the object by applying light to the object at an angle less than 20 degrees from a surface of the object; placing the digital camera substantially perpendicular to the surface of the object.

It is still another object of the invention to apply light from four sides of the object, each light applied placed substantially at 0, 90, 180 and 270 degrees around a perpendicular axis of the surface of the object.

It is yet another object of the invention to enhance the image wherein the enhancing consists of any one of dilating, erosioning or enhancing contrast.

It is a further object of the invention to locate the selected features; and specify an area of each selected feature to be used in the creating the histogram step wherein the specified area consists of any one of a circle, an oval, a rectangle, or a triangle.

It is another object of the invention to ignore features not to be selected.

It is yet another object of the invention, to analyze features consisting of electrical contacts.

It is another object of the invention to reject the object when a predetermined number of features of the object have calculated mean values outside the range of acceptable values.

It is another object of the invention to provide a predetermined criteria within 30% of the average value.

This invention uses the angle of lighting, in conjunction with the software method to determine the Z height difference between features based on a reference mean value calculated from the image histogram and the individual histograms from the features being inspected.

The above as well as additional objectives, features, and advantages of the present invention will become apparent in the following written description.

DESCRIPTION OF THE PREFERRED EMBODIMENT

Figure 1:
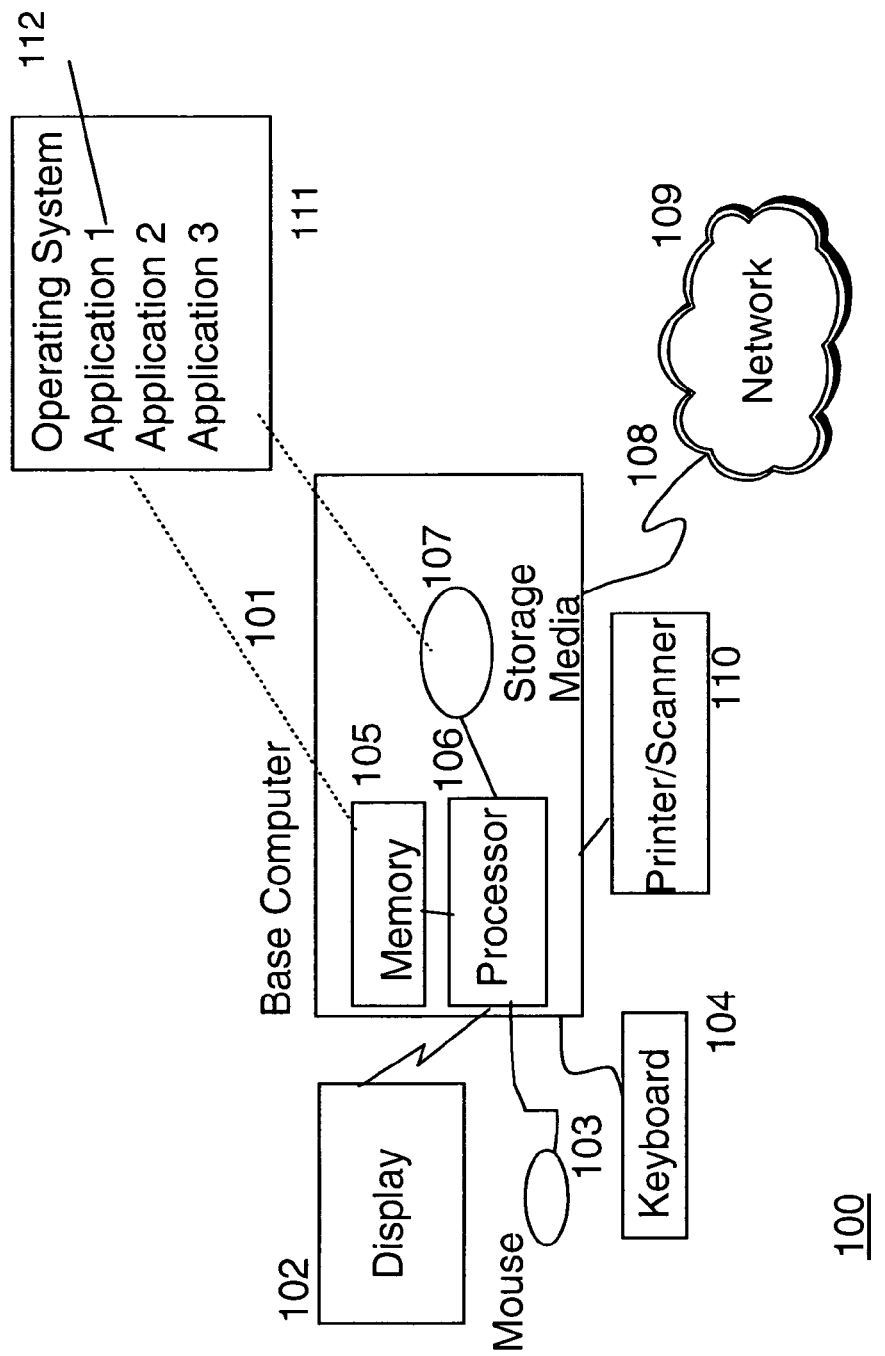
FIG. 1 is a diagram depicting components of a prior art computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
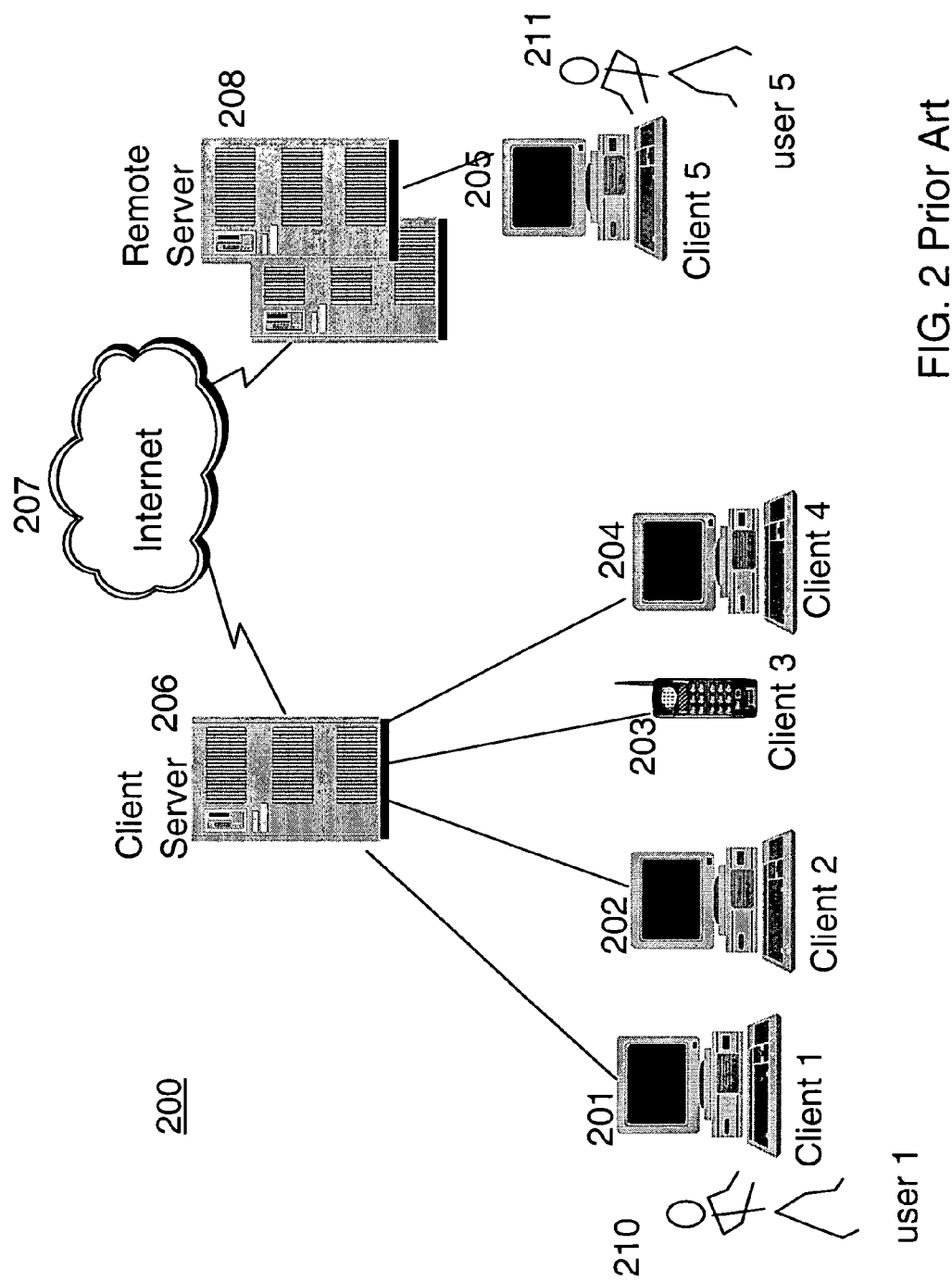
FIG. 2 is a diagram depicting a prior art network of computer systems.

FIG. 2 illustrates a data processing network 200 in which the present invention may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

The present invention may be practiced within a single computer or across a network of cooperating computers.

Figure 13:
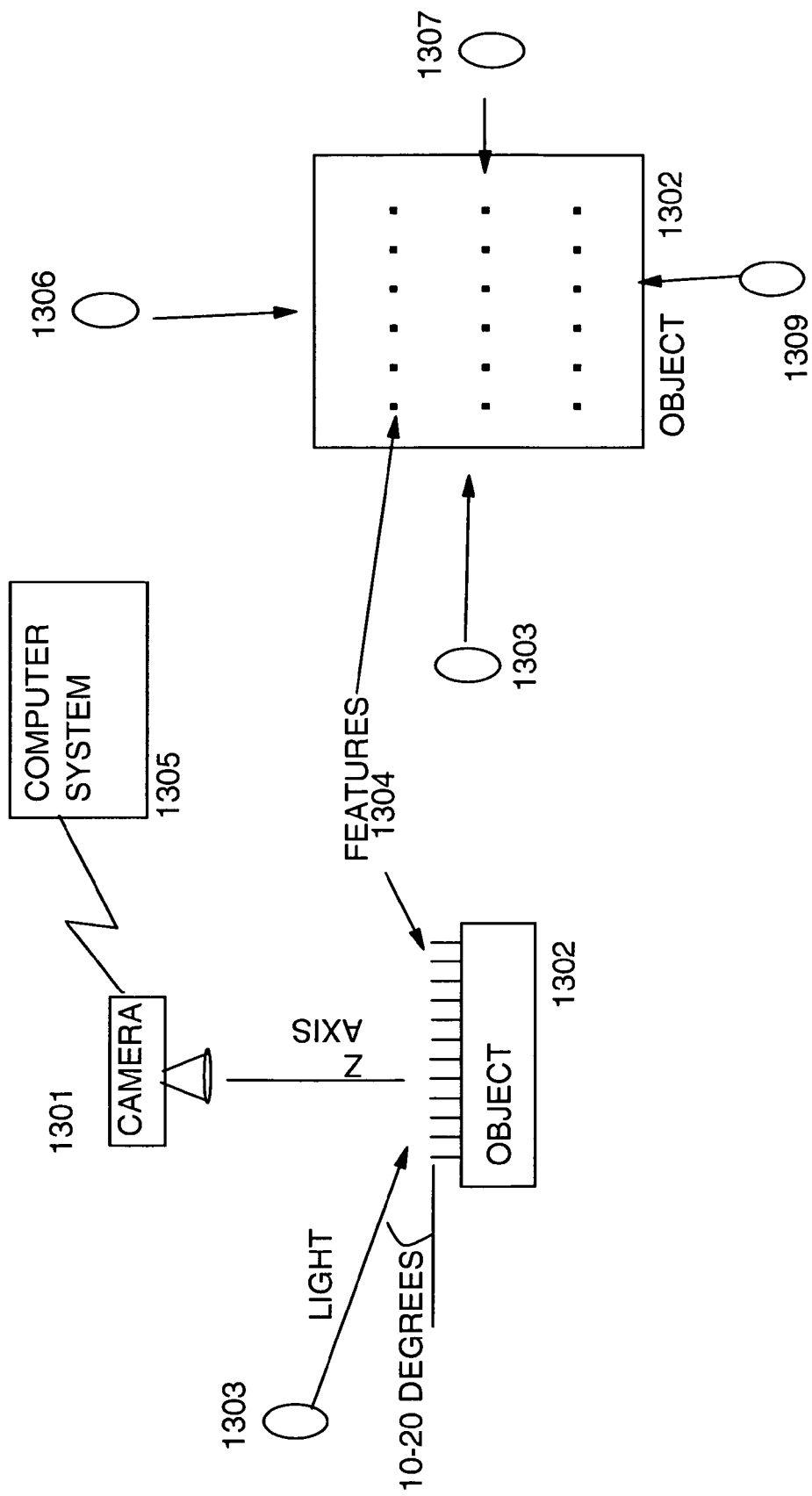
FIG. 13 depicts major components associated with the present invention.

In an embodiment referring to FIG. 13, the present invention employs illuminating features of an object by providing lighting 1303 1103 at optimal angles (preferably 10 to 20 degrees) to get very small differences in the amount of light reflected toward the camera 1301 such that the surfaces of the features 1304 will be slightly lighter if in the +Z direction (nearer the camera 1301, higher) and slightly darker in the −Z direction (further from the camera, lower). Preferably, four lights 1303 1306 1307 1209 are applied to the object 1302 from angles such that the light beams are 90 degrees apart. The image of the object 1302 is transmitted from the camera 1301 to a computer system 1305 for analysis. The histogram of the image is calculated, and two thresholds are used to determine what the mean grey level is for each feature in the image. This reference mean is then used in determining the deviation of each features grey level from the mean of all of the features. Features higher than the others will have a lighter grey level value, and features lower than the others will have a darker grey level value.

In one embodiment, the equipment setup consisted of a fixture that would hold a part being inspected. This fixture had lighting mounted on all four sides of the part being inspected. The angle of the lighting was low (small about 10-20 degrees from parallel) with respect to the surface of the part being inspected. This low angle of lighting created images with good contrast. Thereby, images are produced such that higher features appear brighter and lower features appear darker.

A camera preferably black and white (B&W) but not limited to B&W is mounted on an XY servo system that allows it to be positioned over the part being inspected. This allows a full inspection of the part with a magnification that is sufficient to see required detail of the features on the part being inspected. The camera output is fed into a machine vision system (image processor) that will perform various well known functions on the digitized image such as feature searching, image enhancement (contrast, brightness, etc), and measurements to name a few. These functions are provided by the software that runs on the image processor and are known to one of average skill in the art of Machine Vision. Machine Vision is the art of processing images using a computer.

In an embodiment, the images were taken of an object that contained small balls of wire. Such balls of wire (fuzz balls or fuzz buttons) are used to electrically interconnect signals on the object with another board, typically to mount an electronic component having a die to a board. Other features might be of interest, the present invention can be applied to any number of a variety of well known objects. The balls of wire of the embodiment were being inspected for location, diameter, form, and height. The present invention pertains to the method used in processing the image to detect if any ball of wire was too high or low with respect to the other balls of wire. Such anomalies would potentially result in insufficient contact and defective signal communication. Images were taken over the area of the part containing the balls of wire. The balls were detected and located using feature searching algorithms already known in the art and provided in the software package running on the image processor. The present invention relies on the fact that the balls that are higher on the part being inspected appear brighter in the image and balls that are lower appear darker in the image. Based on this condition, and after each of the balls of wire were found in the image, a circular area was defined that contained the pixel information for each ball in the image. In another embodiment, multiple features could be combined as a single feature. In yet another embodiment, only a predetermined area of each feature might be analyzed. Furthermore, in another embodiment, the area defined may be any shape including, but not limited to a rectangle and an oval. A histogram is generated for each circular area. The histogram is a graph of how many pixels of a particular color exist in the data for that area. Each pixel in the image will have a value from 0 to 255 based on its grey scale color. 0 would be totally black, and 255 would be totally white. Most pixels are some form of grey between 0 and 255. The present invention is not limited to grey images, the teaching of the present invention could be used to advantageously use other colors and a variety of light sources.

Once the histograms are generated for each ball the mean pixel value is determined for each ball. Having a mean value for each ball located in the image, the overall image mean is calculated from the mean values of each ball. With this image mean now calculated, any ball that has a mean deviating from the image mean and some tolerance would be considered a failing wire ball, because it is either too high or too low compared to the mean of the wire balls in the image. In one embodiment, the image is a sub-group of the overall surface and several images must be evaluated to fully cover the objects features. Furthermore, in another embodiment, features to be analyzed might exclude features not to be analyzed, for example, a power connector may have a different shape than a signal connector so the analysis tool would disregard images of the power connectors when analyzing the signal connector heights.

In one embodiment, features were tested with 24 images gathered from actual products, using existing tester lighting (red LED low-field lights).

Figure 3:
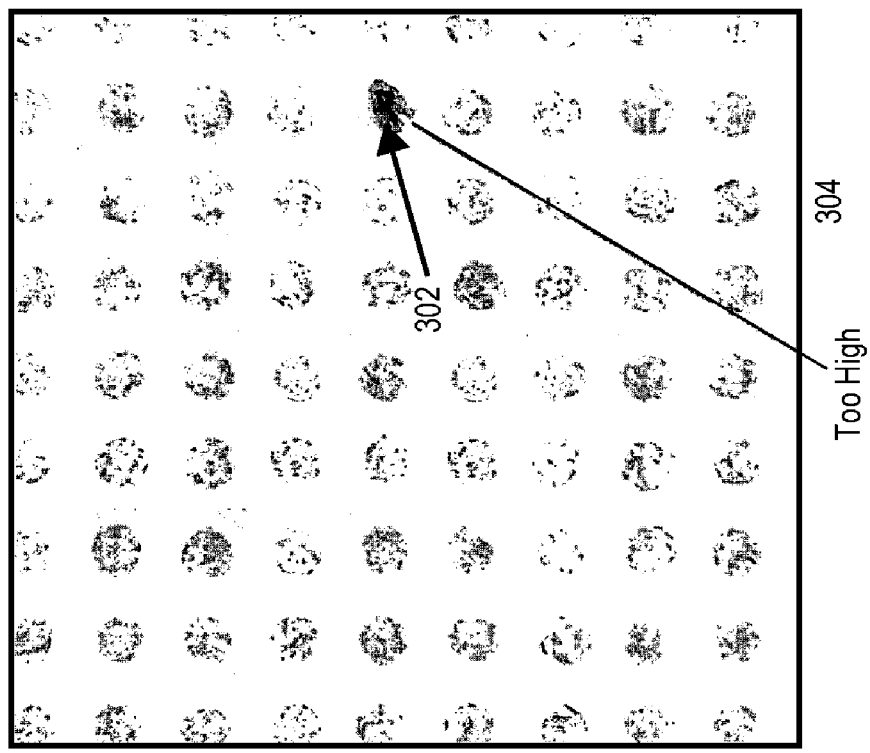
FIG. 3 depicts example images according to the present invention.
Figure 3:
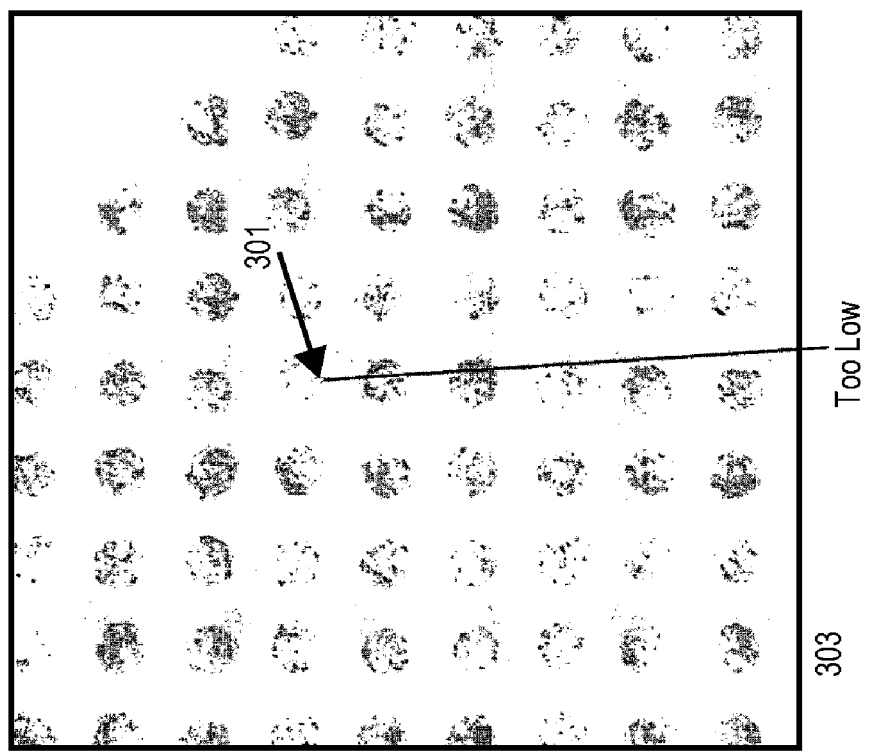

Referring to FIG. 3, it should be noted that the present invention does not measure the height of the contacts but can be used to detect contacts that appear to be too high or too low relative to a plurality of surrounding contacts. Contacts that are placed too low appear darker 301 in the images 303 while contacts that are too high 302 appear brighter in the images 304.

Overall Brightness Compensation:

The overall brightness of each 9×9 (for example) array of contacts region varies depending on how close the region to be analyzed is to the lights. The areas closer to the lights (near the edge of the object) are brighter than the areas near the centre of the object. This means that in order to determine if a contact is too high or too low (too bright or too dark) the reference value has to be extracted from the image itself. This reference value will be different from region to region.

Figure 4:
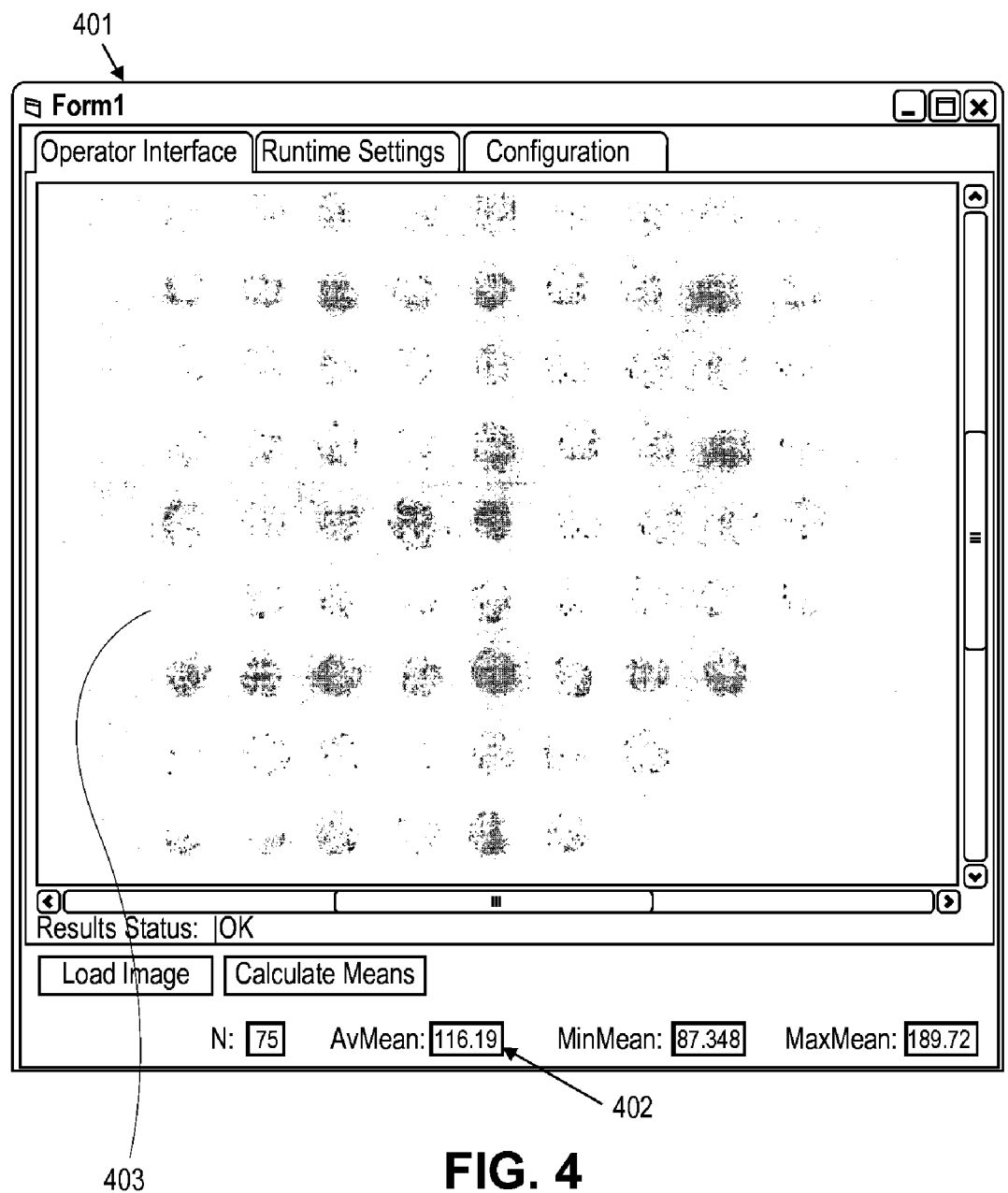
FIGS. 4, 5, 6 depict example regions of a images according to the present invention.
Figure 5:
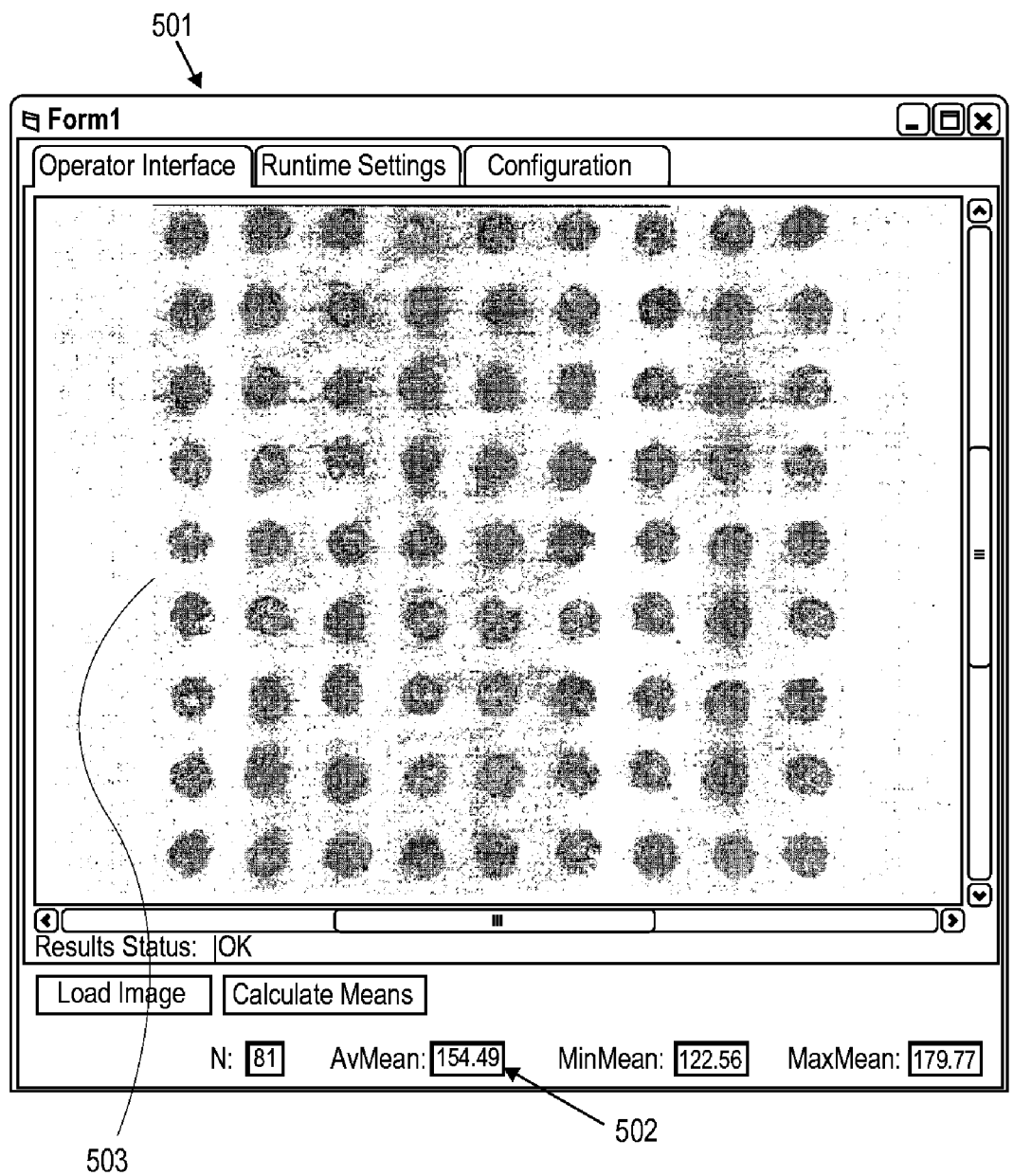
Figure 6:
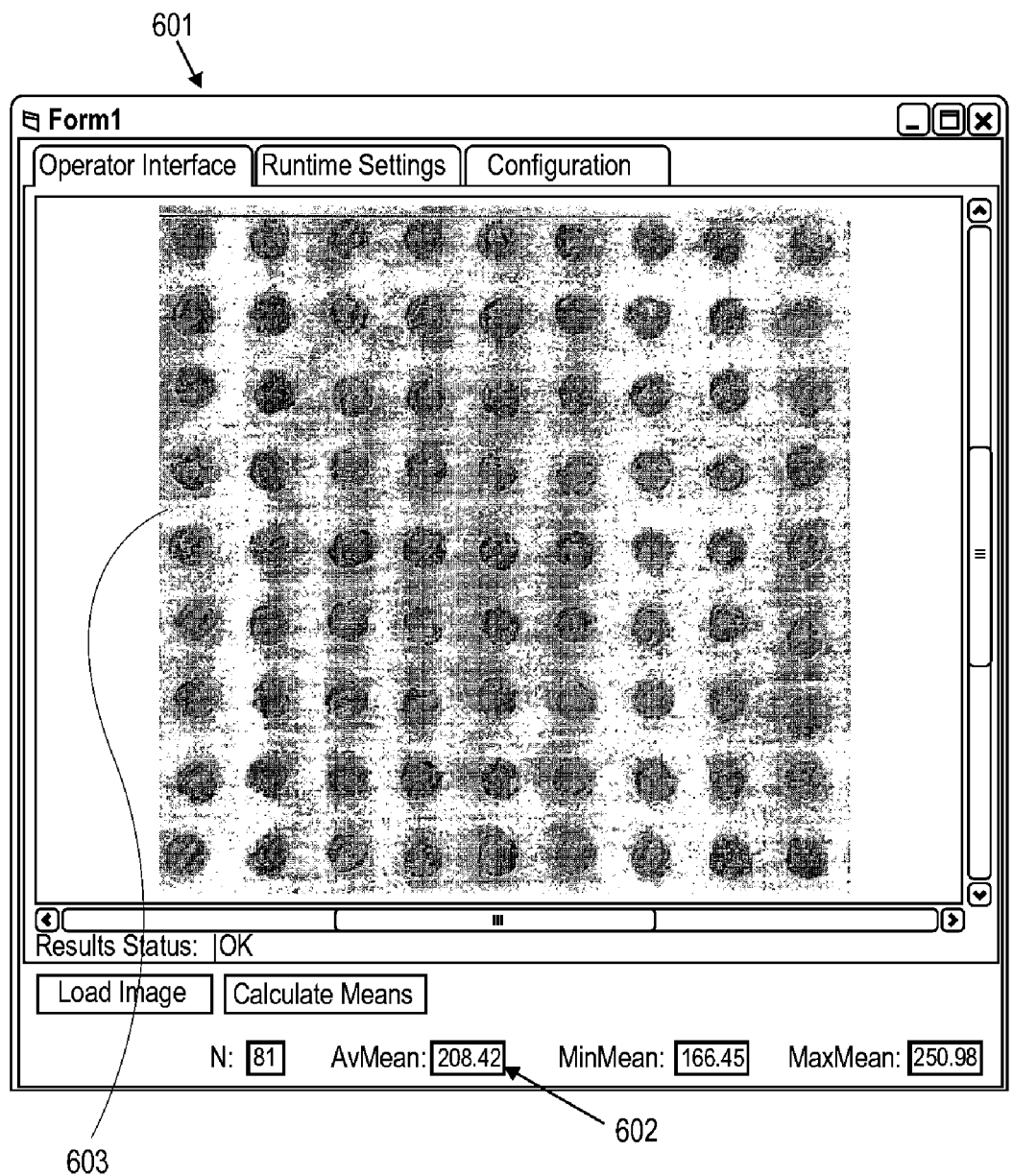

FIGS. 4, 5 and 6 show different regions of the same interposer object 403 503 603 demonstrating that there may be large differences in the overall lighting.

Calculating the reference value for each region (FIG. 12):
1. The histogram 1201 is extracted for the pixels of each individual contact in the image.
2. The mean values for each contact are calculated 1202 and stored 1204, so if there are 81 contacts in the region inspected, we will have 81 mean values. The mean value of each histogram will be the average grey level for each contact.
3. The average of all the mean values is calculated 1203 by adding all the mean values and dividing by the number of contacts and stored 1205. This Average Mean value will be the average grey level for the contacts in that specific region and will be used as our Reference Value.

Using this Average Mean value as a reference, reduces sensitivity to differences in the overall light or to successive image placement.

The Average Mean value 402 for the image 403 of FIG. 4 is 116.19.

The Average Mean value 502 for the image 503 of FIG. 5 is 154.49.

The Average Mean value 602 for the image 603 of FIG. 6 is 208.42.

Image Enhancement

Figure 14:
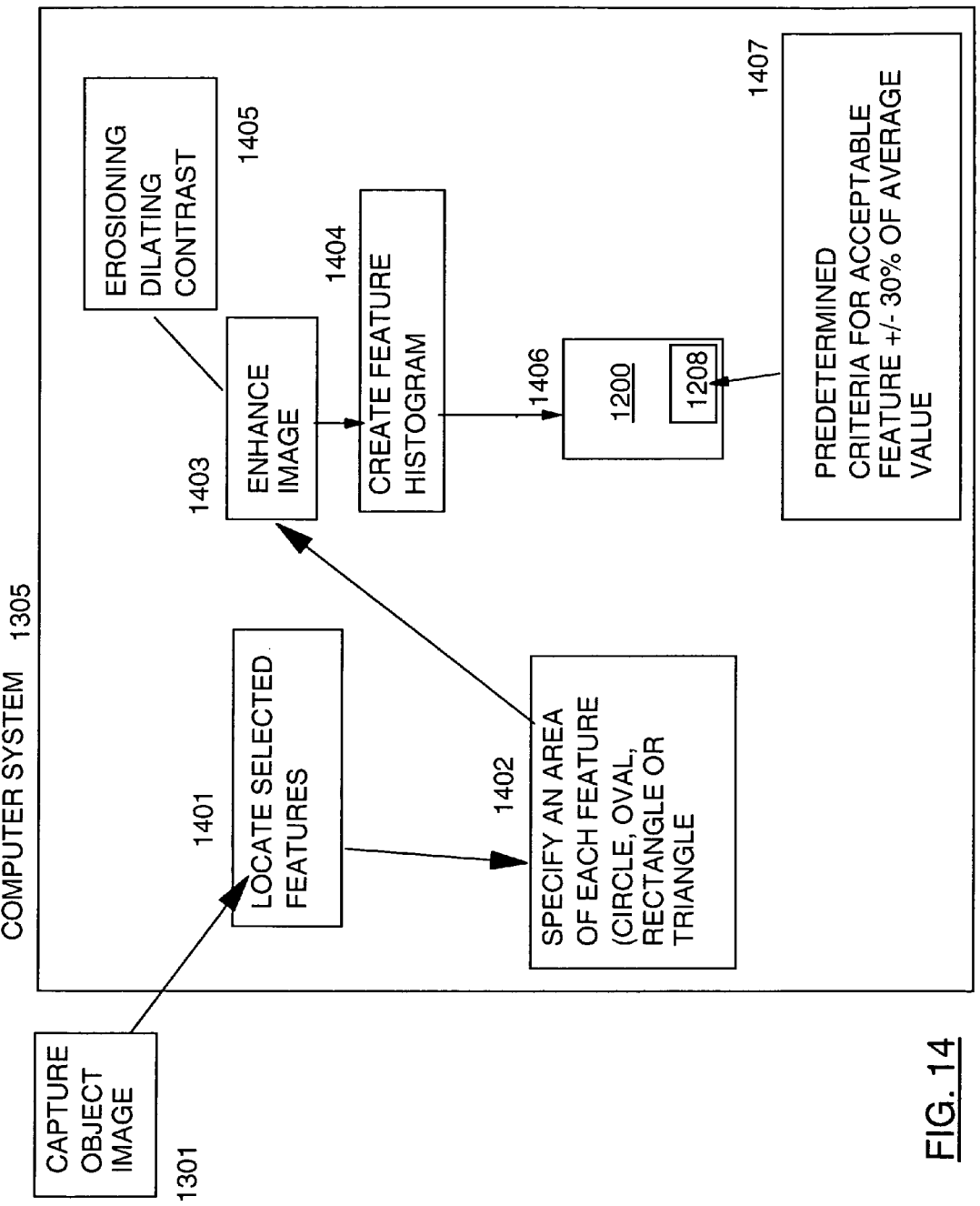
FIG. 14 depicts example object image capture steps of the present invention.

Referring to FIG. 14, before starting to analyze the captured 1301 image and calculating 1406 the histogram values some Image Processing operations 1403 are preferably applied to the image to create enhanced histograms 1404 in order to enhance the contrast and facilitate the inspection. Some of these enhancements 1405 may include but are not limited to Dilate, erosion, enhance contrast. These operations are well known to those skilled in the art of machine vision.

Software packages that perform the vision operations which are standard functions and known to one skilled in the art are. For example, Machine Vision Applications are available from Cognex Corp (Vision Pro, Smart View, and CVL), Matrox Corp. (MIL and Matrox Inspector), Coreco Corp. (Sapera™ Processing, WiT™ Sapera™ LT) for example. Machine Vision systems comprise software packages that are run on the systems to perform various vision operations including: pattern recognition, measurements, image enhancing features to enhance lighting, contrast, and pixel smearing.

Figure 7:
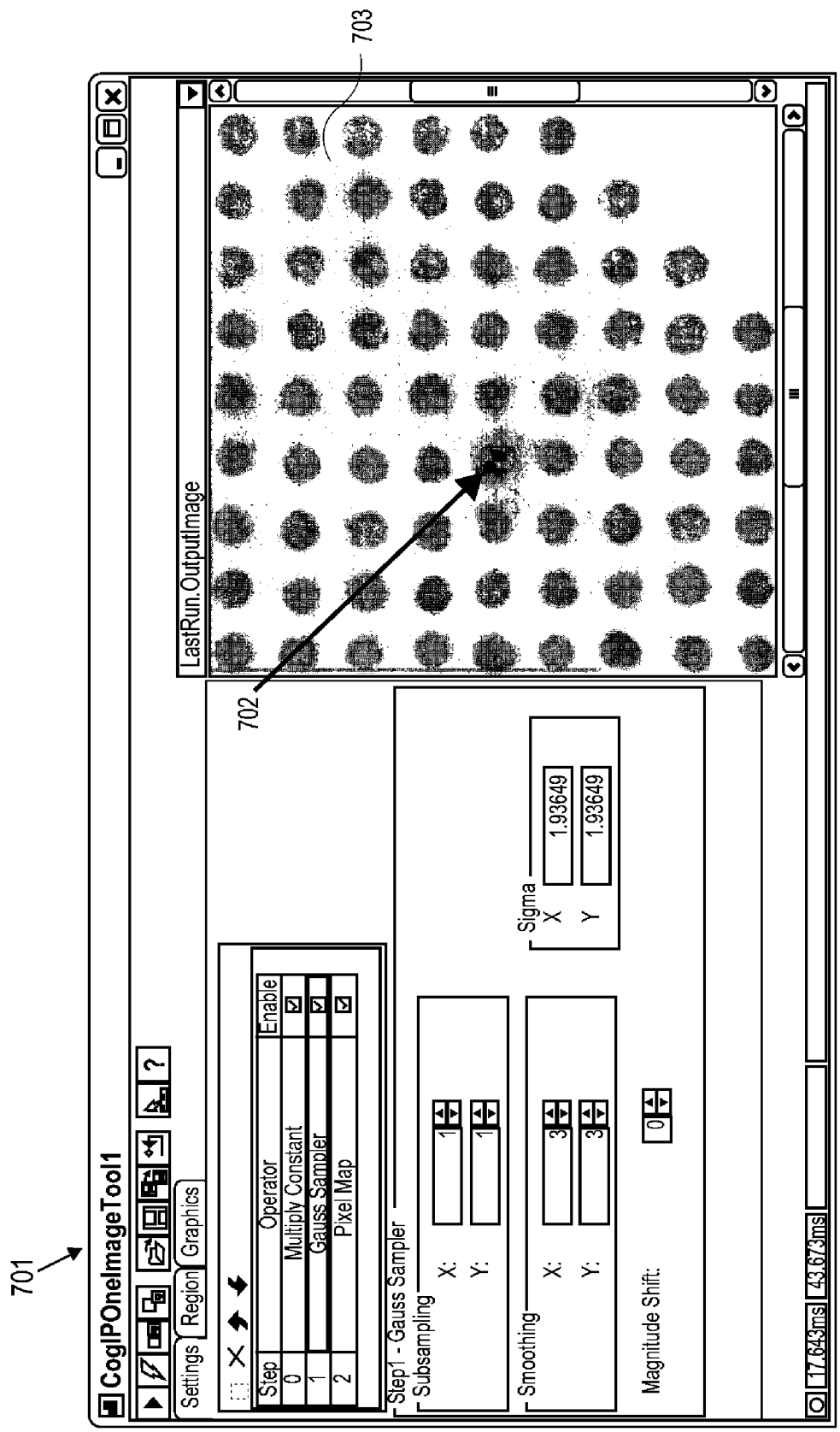
FIG. 7 depicts an example enhanced image according to the present invention.

FIG. 7 shows an enhanced image 703 of the image 403 of FIG. 4. Note how the feature 702 is differentiated from the array of features as a result of the enhancement.

Finding Contact Positions

In certain situations, contacts can be slightly displaced and cannot be assumed to be exactly in the same position of the image every time. In order to achieve maximum accuracy in the calculations, a Pattern Matching tool is used to find 1401 the EXACT positions where the contacts are (in the object being analyzed) and then place the regions 1402 for the individual features histograms to be calculated.

Figure 8:
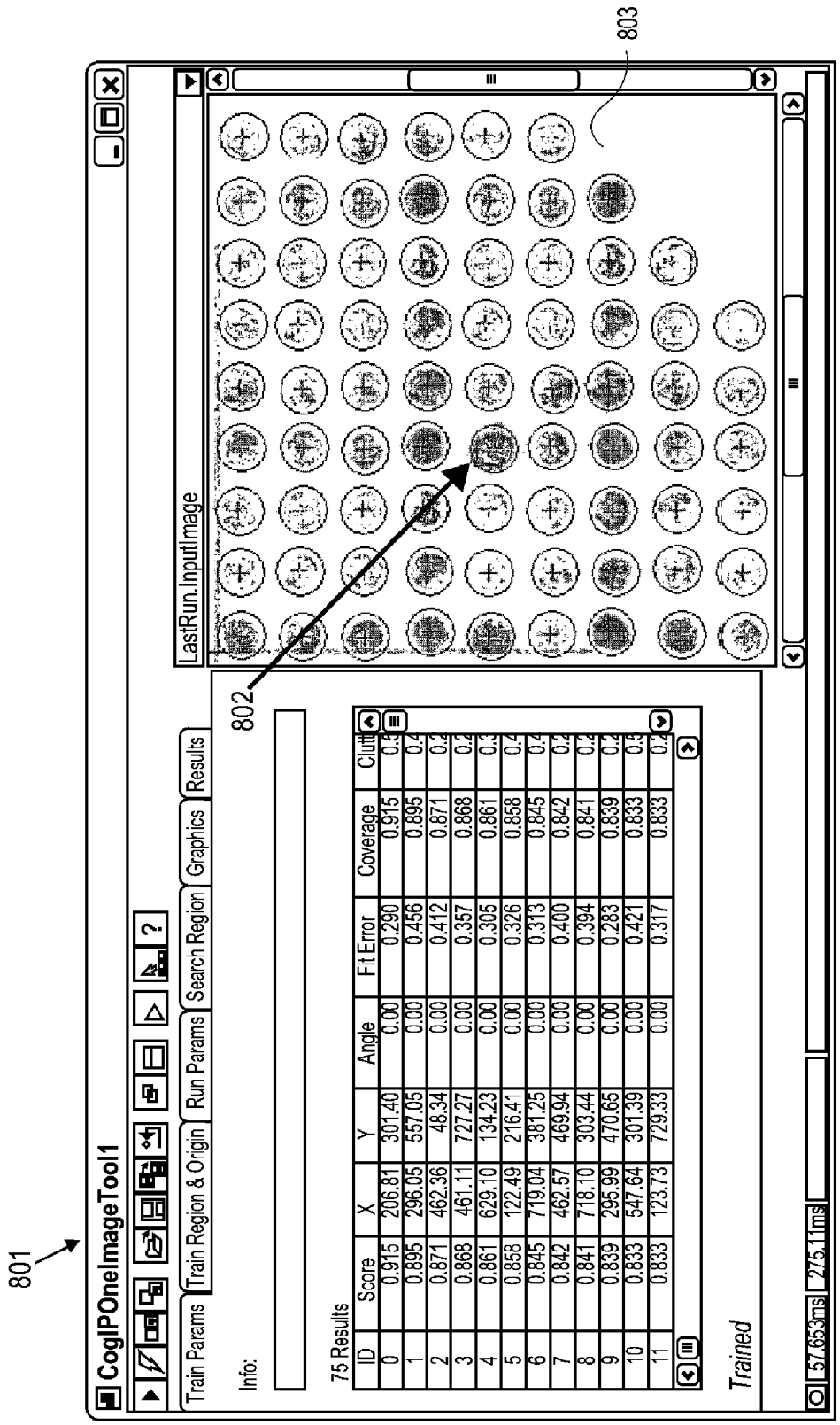
FIG. 8 depicts an example image resulting from a pattern matching tool according to the present invention.

FIG. 8 shows 803 the results of the Pattern Matching tool for the enhanced image 703 having 75 contacts. The tool has drawn circles 802 around each feature identifying the area to be analyzed for each feature. The tool displays information about the image 803 including the X and Y coordinates of each identified feature. In another embodiment, the tool would ignore certain features based on implementation dependent criteria.

Histogram Analysis:

After calculating a reference value (Average Mean), the individual mean values for each contact are compared with this reference value. If the mean value for a contact is much higher or lower than the reference value, that contact will generate a reject. FIG. 14, a predetermined criteria for acceptable features 1407 may be, for example + or −30% of the average value of all features of the image.

Figure 12:
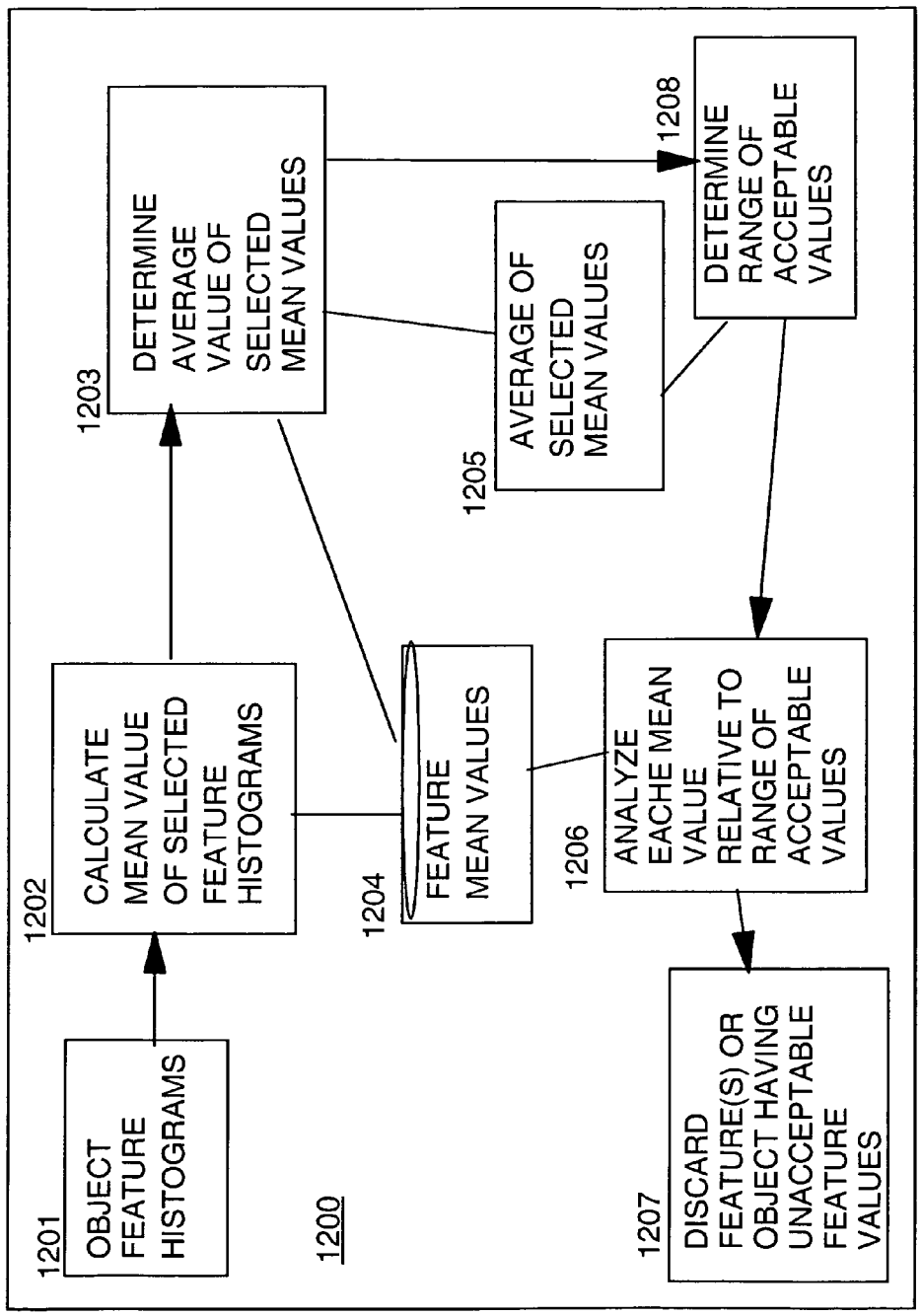
FIG. 12 depicts a feature analyzing method of the present invention.

Referring to FIG. 12, selected object feature histograms 1201 are analyzed by calculating 1202 a mean value for each of the selected feature histograms. The results are saved 1204 and used to determine 1203 an average value of all the selected mean values 1205. A range of acceptable values is determined 1208. Each feature mean value 1204 is analyzed 1206 relative to the determined 1208 range of acceptable values. Features or objects are discarded 1207 when their histograms are outside the range of acceptable values.

Referring to FIG. 14, when an image is captured 1301 and sent to the analyzer computer system 1305, an application locates 1401 selected features. The application specifies an area 1402 of each feature to be analyzed. The area may be any of a variety of shapes including oval, rectangle, triangle and the like. The specified area is enhanced 1403 and an enhanced feature histogram is created 1404. The enhanced feature histogram is analyzed 1406 according to predetermined 1407 criteria for acceptable features. The acceptance 1407 level is preferably within 30% of the average value of all of the selected features.

In a preferred embodiment (FIG. 13), the contacts with a histogram mean value either smaller than (0.75* Average Mean) or bigger than (1.25*Average Mean) were rejected. This means that all the contacts with histogram mean values between (0.75*Average Mean) and (1.25* Average Mean) will be passed. These factors (0.75 and 1.25) can be configurable to make the system more or less demanding about the accepted heights.

Figure 9:
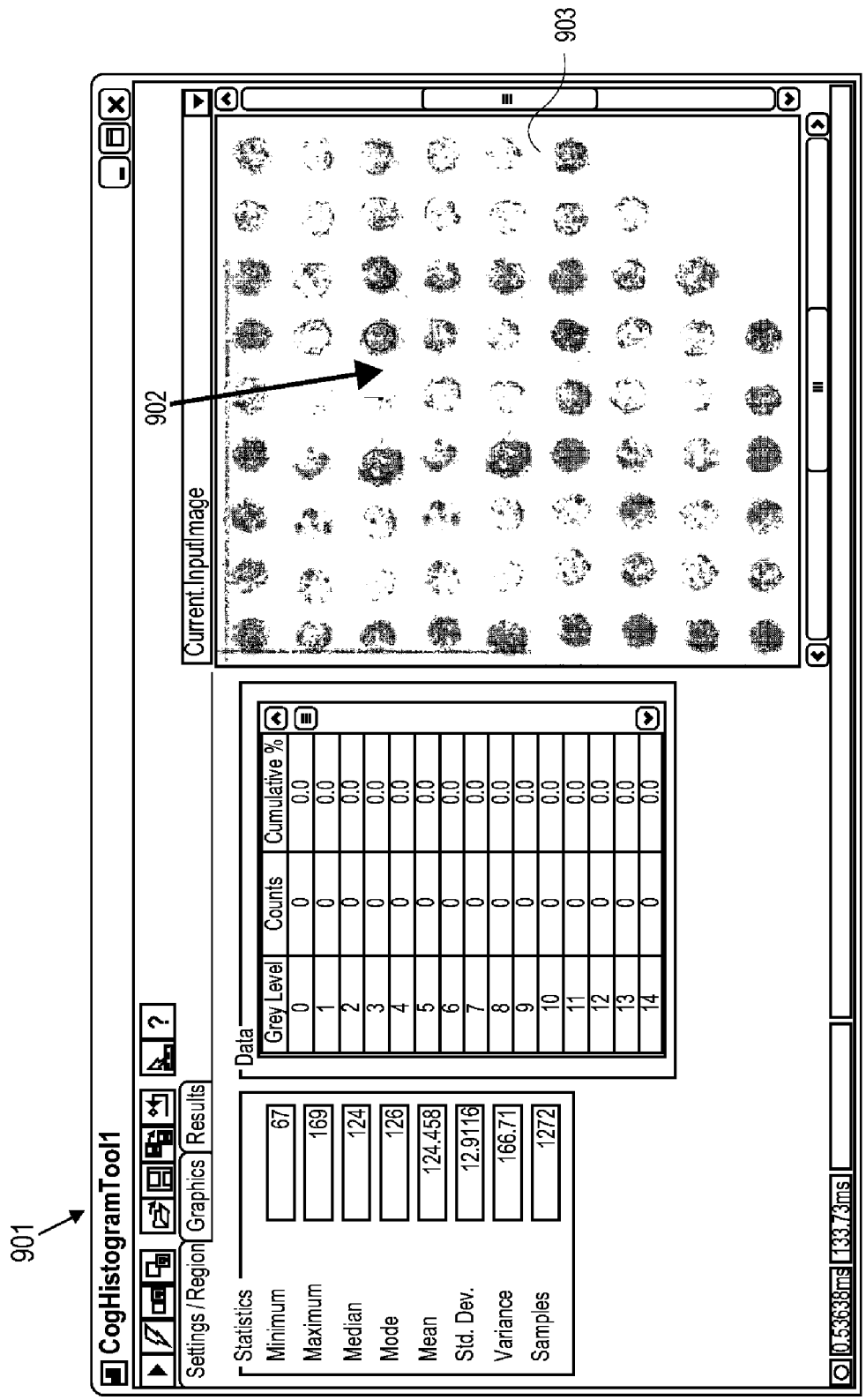
FIGS. 9, 10, 11 depict example images according to the present invention; and show the mean brightness value for the feature located in the circle.

The region (referring to FIG. 9) of the interposer 903 has an Average Mean value of 116.19. The selected contact (feature) 902 has a histogram mean value 904 of 124.458. The maximum allowed value for the histogram mean is 1.25*116.19=145.24. The minimum allowed value for the histogram mean is 0.75*116.19=87.1425. The mean value for this contact (124.458) is smaller than 145.24 and bigger than 87.1425 so this contact is passed.

Figure 10:
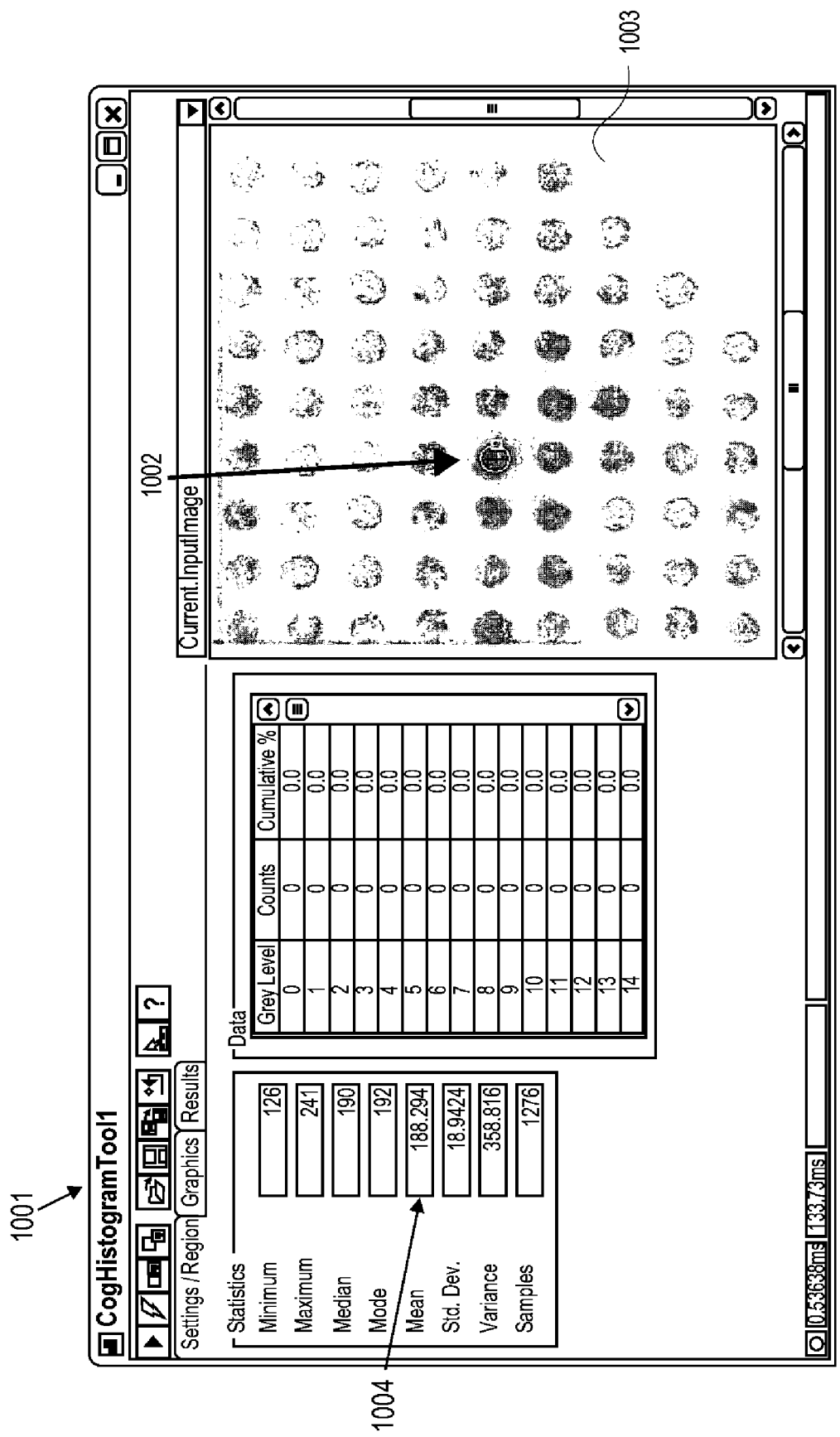

Referring to FIG. 10, this region 1002 of the interposer has an Average Mean value of 116.19. The selected contact 1002 has a histogram mean value 1004 of 188.294. The maximum allowed value for the histogram mean is 1.25*116.19=145.24. The mean value for this contact (188.294) is bigger than 145.24 so this contact is rejected.

Figure 11:
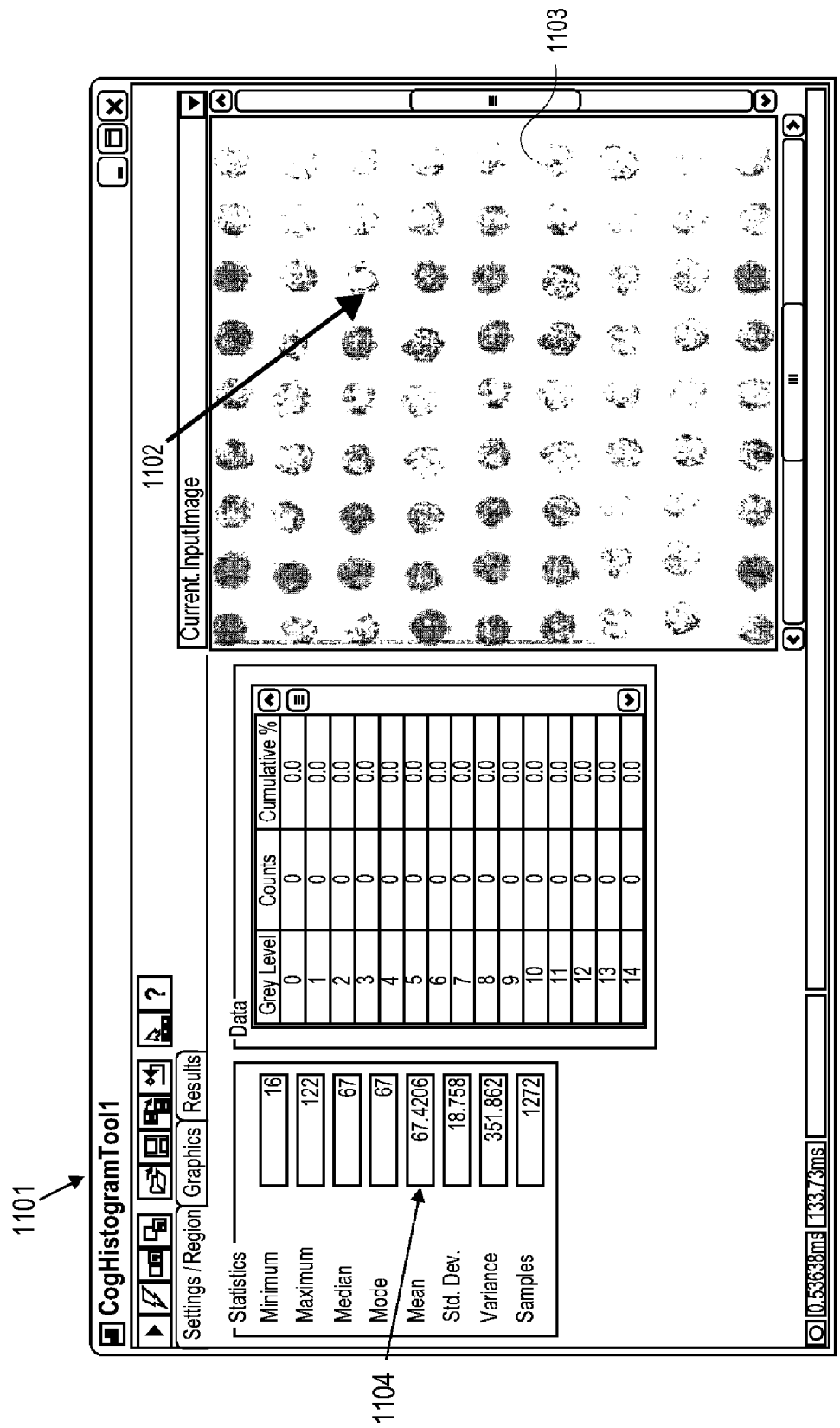

Referring to FIG. 11, this region 1103 of the interposer has an Average Mean value of 107.82. The selected contact 1102 has a histogram mean value of 67.4206. The minimum allowed value for the histogram mean is 0.75*107.82=80.865. The mean value for this contact (67.4206) is smaller than the 80.865 so this contact is rejected.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for detecting heights of a mechanical object, the method comprising the steps of:
   creating from an image of the mechanical object, a feature histogram of each of a plurality of selected features of the object, by a processor of a computing device, each selected feature corresponding to one or more of the heights of the mechanical object along an axis perpendicular to a plane of the image of the object, the image captured along the axis, such that the heights of the object are not measured, where the feature histograms of the selected features contain brightness information of the object at the heights of the selected features;
   a) calculating a mean value for each of the feature histograms created, by the processor of the computing device;
   b) calculating an average value of the plurality of calculated mean values, by the processor of the computing device;
   c) determining from the average value, a range of values according to predetermined criteria, by the processor of the computing device;
   d) determining whether each calculated mean value is within the range of values, by the processor of the computing device, to determine whether the heights are within a predetermined range without having to measure the heights of the object.

2. The method according to claim 1, comprising the further steps of: capturing the image of the object with a digital camera; and transferring the image of the object from the digital camera to an analyzing computer system for performing steps a) through c).

3. The method according to claim 2, comprising the further steps of: illuminating the object by applying light to the object at an angle less than 20 degrees from a surface of the object; for capturing the image, placing the digital camera substantially perpendicular to the surface of the object.

4. The method according to claim 3, wherein the applied light is applied from four sides of the object, each light applied placed substantially at 0, 90, 180 and 270 degrees around a perpendicular axis of the surface of the object.

5. The method according to claim 1, comprising the further step of: prior to the creating the histogram step, enhancing the image wherein the enhancing consists of any one of dilating, erosioning or enhancing contrast.

6. The method according to claim 1, comprising the further steps of: locating the selected features; specifying an area of each selected feature to be used in the creating the histogram step wherein the specified area consists of any one of a circle, an oval, a rectangle, or a triangle.

7. The method according to claim 6, wherein the locating step ignores features not to be selected.

8. The method according to claim 1, wherein the feature consists of an electrical contact.

9. The method according to claim 1, comprising the further step of rejecting the object when a predetermined number of features of the object have calculated mean values outside the range of acceptable values.

10. The method according to claim 1, wherein the predetermined criteria is within 30% of the average value.

11. A system for detecting heights of a mechanical object, the system comprising:
    a memory;
    a computer system in communication with the memory; a camera in communication with the computer system; a light source projecting light on features of the object wherein the computer system includes instructions to execute a method comprising:
    creating from an image of the mechanical object, a feature histogram of each of a plurality of selected features of the object, each selected feature corresponding to one or more of the heights of the object along an axis perpendicular to a plane of the image of the object, the image captured along the axis, such that the heights of the object are not measured, where the feature histograms of the selected features contain brightness information of the object at the heights of the selected features;
    a) calculating a mean value for each of the feature histograms created;
    b) calculating an average value of the plurality of calculated mean values;
    c) determining from the average value, a range of values according to predetermined criteria;
    d) determining whether each calculated mean value is within the range of values, to determine whether the heights are within a predetermined range without having to measure the heights of the object.

12. The system according to claim 11, wherein the system further comprises the steps of: capturing the image of the object with a digital camera; and transferring the image of the object from the digital camera to an analyzing computer system for performing steps a) through c).

13. The system according to claim 11, wherein the system further comprises the steps of: illuminating the object by applying the light to the object at an angle less than 20 degrees from a surface of the object for capturing the image, placing the digital camera substantially perpendicular to the surface of the object.

14. The system according to claim 13, wherein the applied light is applied from four sides of the object, each light applied placed substantially at 0, 90, 180 and 270 degrees around a perpendicular axis of the surface of the object.

15. The system according to claim 11, wherein the system further comprises the steps of: locating the selected features; specifying an area of each selected feature to be used in the creating the histogram step wherein the specified area consists of any one of a circle, an oval, a rectangle, or a triangle.

16. A computer-readable storage medium having a computer program stored thereon for execution by processor of a computing device, wherein execution of the computer program by the processor causes a method to be performed, the method for detecting heights of a mechanical object, the method comprising:

creating from an image of the mechanical object, a feature histogram of each of a plurality of selected features of the object, each selected feature corresponding to one or more of the heights of the object along an axis perpendicular to a plane of the image of the object, the image captured along the axis, such that the heights of the object are not measured, where the feature histograms of the selected features contain brightness information of the object at the heights of the selected features;

a) calculating a mean value for each of the feature histograms created;

b) calculating an average value of the plurality of calculated mean values;

c) determining from the average value, a range of values according to predetermined criteria;

d) determining whether each calculated mean value is within the range of values, to determine whether the heights are within a predetermined range without having to measure the heights of the object.

17. The computer-readable storage medium according to claim 16, wherein the method further comprises the steps of: capturing the image of the object with a digital camera; and transferring the image of the object from the digital camera to an analyzing computer system for performing steps a) through c).

18. The computer-readable storage medium according to claim 16, wherein the method further comprises the steps of: illuminating the object by applying light to the object at an angle less than 20 degrees from a surface of the object; for capturing the image, placing the digital camera substantially perpendicular to the surface of the object.

19. The computer-readable storage medium according to claim 18, wherein the applied light is applied from four sides of the object, each light applied placed substantially at 0, 90, 180 and 270 degrees around a perpendicular axis of the surface of the object.

20. The computer-readable storage medium according to claim 16, wherein the method further comprises the steps of: locating the selected features; specifying an area of each selected feature to be used in the creating the histogram step wherein the specified area consists of any one of a circle, an oval, a rectangle, or a triangle.

* * * * *